United States Patent [19]
Ould-Ali et al.

[11] Patent Number: 5,649,091
[45] Date of Patent: Jul. 15, 1997

[54] LOCAL AREA NETWORK REDUNDANT PIECES OF INTERCONNECTION EQUIPMENT A FALSE PHYSICAL ADDRESS AND A LOGICAL ADDRESS IN COMMON TO FORM A UNIQUE ENTITY

[75] Inventors: Abdelhamid Ould-Ali, Palaiseau; Nicolas Geffroy, Chatenay Malabry; Alain Burgain, Paris, all of France

[73] Assignee: U.S. Philips Corporation, New York, N.Y.

[21] Appl. No.: 489,868

[22] Filed: Jun. 13, 1995

[30] Foreign Application Priority Data

Jun. 15, 1994 [FR] France ................... 94 07310

[51] Int. Cl.$^6$ ........................................ G01F 13/00
[52] U.S. Cl. ............ 395/182.09; 395/410; 395/200.01; 364/944.2; 370/228; 379/279
[58] Field of Search ................. 370/16, 85; 364/900, 364/119, 944.2; 307/441; 395/410, 182.09

[56] References Cited

U.S. PATENT DOCUMENTS

| | | | |
|---|---|---|---|
| 4,276,593 | 6/1981 | Hansen | 364/119 |
| 4,692,918 | 9/1987 | Elliott et al. | 370/85 |
| 4,800,302 | 1/1989 | Marum | 307/441 |
| 5,016,244 | 5/1991 | Massey, Jr. et al. | 370/16 |
| 5,018,133 | 5/1991 | Tsukakoshi et al. | 370/16 |
| 5,058,056 | 10/1991 | Hammer et al. | 364/900 |
| 5,218,600 | 6/1993 | Schenkyr et al. | 370/16 |
| 5,473,599 | 12/1995 | Li et al. | 370/16 |

OTHER PUBLICATIONS

"Request for Comments 1256", published by IETF, Sep. 1991 and entitled ICMP Router Discovery Messages.

*Primary Examiner*—Thomas C. Lee
*Assistant Examiner*—Duo Chen
*Attorney, Agent, or Firm*—David R. Treacy

[57] ABSTRACT

The invention relates to a local area network interconnection system through a wide area network, certain interconnection nodes of this network being formed by a plurality of redundant pieces of interconnection equipment. According to the invention, the redundant pieces of interconnection equipment have a false physical address and a logical address in common to form a unique entity with respect to the stations of the local area network, while only a single one of the pieces of interconnection equipment of this entity performs a function of bridge/router at a given instant and the others are intended to ensure support in the case of breakdown. The redundant pieces of interconnection equipment further comprise monitoring means for monitoring their respective states by exchanges of frames on the local area network.

14 Claims, 2 Drawing Sheets

LOCAL AREA NETWORK REDUNDANT PIECES OF INTERCONNECTION EQUIPMENT A FALSE PHYSICAL ADDRESS AND A LOGICAL ADDRESS IN COMMON TO FORM A UNIQUE ENTITY

BACKGROUND OF THE INVENTION

1. Field of the invention

The present invention relates to a local area network interconnection system comprising at least two local area networks interconnected via a wide area network, certain interconnection nodes being formed by at least two redundant pieces of interconnection equipment, each piece of interconnection equipment having a specific physical address.

The invention likewise relates to a piece of network interconnection equipment intended to be used in such a system.

The invention has highly significant applications in the field of company local area network interconnections. For example, such an interconnection system is very often used for interconnecting agencies of a business with the remote servers of its headquarters via pieces of interconnection equipment of the bridge/router type. In this case the end local area networks and the wide area network (Ethernet and X25 in most cases) provide great reliability, and the weakest link in the chain of the system is formed by the pieces of interconnection equipment particularly on the side of the servers.

2. Discussion of the Related Art

To improve their reliability, it is known that a plurality of redundant IP routers are used for the critical pieces of interconnection equipment, while the system thus formed is managed on the basis of exchanges of specific ICMP messages between said IP routers and the stations of the local area networks connected to these routers. This ICMP message exchange mechanism is described in the document "Request For Comments 1256", published by IETF, September 1991 and entitled "ICMP Router Discovery Messages".

More particularly, these specific ICMP messages which are encapsulated in IP frames, make it possible for the stations of the various local area networks to learn the addresses of the IP interfaces of the routers which are located in the Internet subnetwork to which they belong. Such messages are periodically transmitted by the routers to the stations. In each message can be indicated various addresses with an degree of preference; for transmitting their frames the stations will utilize the address that has the most preference at a specific instant. Each message additionally comprises a field which indicates the validity limit of the addresses transmitted in the message, so that the stations discard addresses of the routers that have a breakdown or are no longer accessible.

Thus, a plurality of IP routers can be connected redundantly. They periodically transmit each specific ICMP messages which indicate their address and the degree of preference that has been assigned to them. For transmitting their frames, the stations of the local area network use the router whose address has the most preference. When this router becomes inaccessible (in the case of a breakdown of the piece of interconnection equipment or of the link, for example), the stations no longer receive the ICMP messages from the router and, consequently, when the validity of the last received message has expired, they discard the existence of the router and direct their frames to the remaining router that has more preference.

This method, however, has the great drawback of being applicable only to pieces of interconnection equipment of the IP router type toward stations which emulate the IRDP protocol (ICMP Router Discovery Protocol).

SUMMARY OF THE INVENTION

It is an object of the present invention to propose a local area network interconnection system of which certain interconnection nodes are formed by redundant pieces of interconnection equipment while the system proposed is independent of the type of these pieces of interconnection equipment and of the protocols they manage (bridges, bridge/routers, multiprotocol routers ... ).

Therefore, a local area network interconnection system according to the invention as described in the introductory paragraph is characterized in that —said redundant pieces of interconnection equipment have a false physical address and a logical address in common to form a unique entity with respect to stations of the local area network to which they are connected, this entity comprising at a given instant at least one piece of interconnection equipment called active piece of interconnection equipment which ensures a function of bridge/router, and one other piece of interconnection equipment called stand-by piece of interconnection equipment which is intended to ensure support to the active piece of interconnection equipment, —and in that they comprise monitoring means for monitoring their respective states by exchanges of frames called monitoring frames on said local area network.

Thus, the redundant pieces of interconnection equipment of the same node are structured identically (with the exception of their specific physical addresses which are different), so that they are regarded as a unique entity by the stations of the local area network. The switching operation of the bridge/router function from one piece of interconnection equipment to another is thus transparent to the stations of the local area network.

Moreover, the monitoring state which consists of exchanging via the local area network monitoring frames between the redundant pieces of interconnection equipment of the interconnection node (by utilizing their specific physical addresses) provides the advantage of not utilizing the stations of the local area network and being totally independent of the protocol managed by said pieces of interconnection equipment.

In a preferred embodiment of the interconnection system according to the invention, said monitoring means make it possible:

—for the active piece of interconnection equipment to transmit regularly a monitoring frame which indicates its state on said local area network and has the stand-by piece of interconnection equipment as its destination, —for the stand-by piece of interconnection equipment to monitor the reception of said monitoring frames to pass to the active state when it no longer receives them.

In a particularly advantageous manner, in a local area network interconnection system according to the invention, each of the two redundant piece of interconnection equipment of the same node is seen along a connection by the remote pieces of interconnection equipment of the wide area network, while one of these connections is structured as the primary connection and the other as a secondary connection, and in that said remote pieces of interconnection equipment comprise means for trying to establish with priority in an attempt at connecting to a redundant node, said primary connection and after that, only in the case of a breakdown, said secondary connection.

This solution provides the advantage of being independent of the type of wide area network.

Another object of the present invention is to propose a piece of network interconnection equipment intended to be used in such an interconnection system while possibly being connected redundantly to at least one other piece of network interconnection equipment to form a redundant network interconnection node.

According to the invention, such a piece of network interconnection equipment is characterized in that
—it has a false physical address,
—and it comprises monitoring means for monitoring the state of the other piece of interconnection equipment forming said interconnection node by exchanging frames, called monitoring frames, on the local area network to which they are connected, so that at a given instant a single piece of equipment called active piece of interconnection equipment ensures a function of bridge/router, while the other piece of interconnection equipment called stand-by piece of interconnection equipment is intended to ensure support to the active piece of interconnection equipment.

These and other aspects of the invention will be apparent from and elucidated with reference to the embodiments described hereinafter.

DESCRIPTION OF PREFERRED EMBODIMENTS

Figure 1:
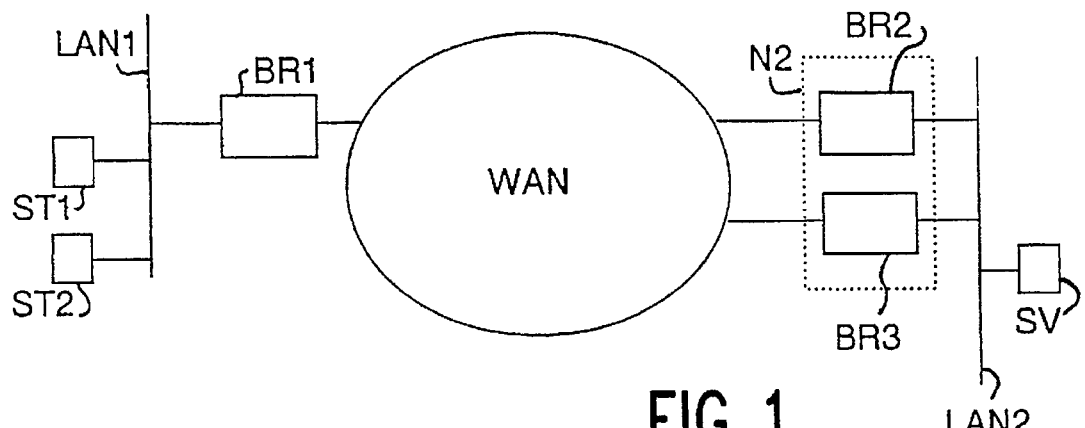
—FIG. 1 shows an embodiment for a local area network interconnection system according to the invention.

According to FIG. 1, a local area network interconnection system according to the invention comprises a local area network LAN1 to which are connected workstations ST1 and ST2. This local area network is connected to a wide area network WAN via a piece of interconnection equipment of the bridge/router type BR1. On the other hand, this network interconnection system also comprises a remote local area network LAN2 to which is connected a server SV. This local area network LAN2 is connected to the wide area network WAN via an interconnection node N2 formed by two redundant pieces of interconnection equipment of the bridge/router type BR2 and BR3.

In the following of the exposition these local area networks LAN 1 and LAN2 will be considered Ethernet networks and the wide area network WAN an X25 network, but other types of networks can also be used (for example, Token Ring for the local area networks or a network of the Frame Relay type for the wide area network).

At a given instant only either of these pieces of interconnection equipment, for example, BR2, plays the role of bridge/router in its processing of the data it receives. This piece of interconnection equipment BR2 is in an active state. It regularly transmits a frame called monitoring frame on the local area network LAN2, which frame has the other piece of interconnection equipment BR3 as its destination, to indicate thereto that it is in an active state.

Piece of interconnection equipment BR3 is in the stand-by mode: its only role is thus to check the monitoring frames transmitted by the active piece of interconnection equipment BR2 on the local area network LAN2.

Thus, where the wide area network is a network of the X25 type, a virtual circuit is established between the pieces of interconnection equipment on which the calling station and the called station depend when the communication is initialized. The interconnection node N2 is seen by the remote pieces of interconnection equipment of the wide area network along two different network connections, one of these connections being structured as a primary connection and the other as a secondary connection. Preferably, the primary connection is associated to the redundant piece of interconnection equipment which has an active role in the normal operating mode, that is to say, associated to the redundant piece of interconnection equipment that has the smaller physical address. While the communication is initialized, the remote piece of interconnection equipment on which the calling station depends attempts to establish the primary connection. When this attempt fails, it then attempts to establish the secondary connection. At a given instant only the connection to the active piece of interconnection equipment can be established while the requests for calls transmitted to the stand-by piece of interconnection equipment are ignored by the latter.

For example, if station ST1 of the local area network LAN1 wishes to ask for a file transfer to the server SV of the remote local area network LAN2, the piece of interconnection equipment BR1 will first try and establish the primary connection to the redundant piece of interconnection equipment BR2. If this piece of interconnection equipment BR2 is active, it will respond to the call request and a virtual circuit will be established between the pieces of interconnection equipment BR1 and BR2. On the other hand, if the piece of interconnection equipment BR2 is not active, it will ignore this call request and piece of interconnection equipment BR1 will try and establish the secondary connection to the piece of interconnection equipment BR3.

In the case where the wide area network would be a network of an unconnected type, a virtual circuit would similarly be established upon the arrival of each data packet at the active piece of interconnection equipment.

Moreover, the pieces of interconnection equipment BR2 and BR3 have a false physical address in common which is different from their specific physical address and which is the only one to be known to the stations of the network, and also have an identical logical address. The interconnection node N2 thus forms a single fictitious machine with a redundant structure. This is what permits, in the case of a breakdown of the active piece of interconnection equipment BR2, the substitution of this active piece of interconnection equipment in a transparent manner to the whole system by the piece of interconnection equipment BR3 to ensure support to the multiprotocol bridge/router function.

This false physical address is specified by the configurator who selects a number consisting of two hexadecimal characters to which the piece of interconnection equipment adds the address assigned at the manufacturer's.

Figure 2:
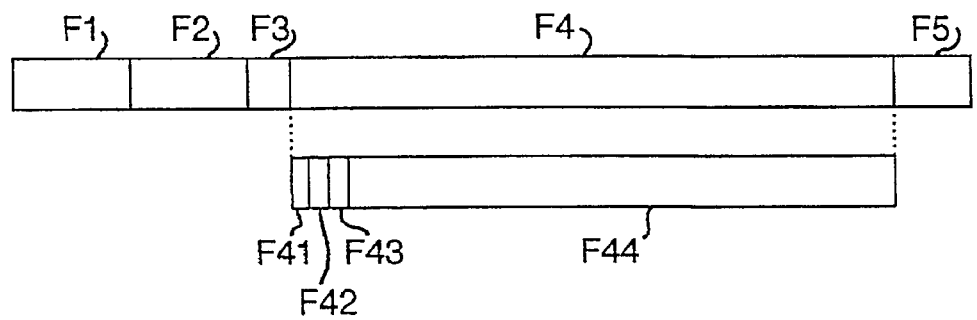
—FIG. 2 shows an embodiment for a monitoring frame exchanged between redundant pieces of interconnection equipment.

FIG. 2 gives a representation of the structure of a monitoring frame exchanged between the two redundant pieces of interconnection equipment BR2 and BR3. This frame is a TEST frame of the datalink layer defined by the OSI 802.2 standard. It is carried in the data field of the frames of the physical layer, that is to say, when considering again the embodiment of FIG. 1, in the data field of the Ethernet frames. Such an Ethernet frame thus comprises:

— a first field F1 of 6 octets, which indicates the physical destination address of the frame, that is to say, in this example, the false physical address of the redundant piece of interconnection equipment,
— a second field F2 of 6 octets, which indicates the source address of the frame, that is to say, the specific physical address of the piece of interconnection equipment transmitting the frame,
— a third field F3 of 2 octets, which indicates the length of the data field of the frame, which is 30 octets in this example,
— a fourth field F4, which forms said data field and contains thus the TEST frame of the data link layer (this TEST frame will be described in the following),
— a fifth field F5 encoded in 4 octets, which contains a check sequence currently called "checksum" and which makes it possible to detect possible errors in the frame.

The fourth field which contains the TEST frame of the data link layer is a combination of:

— a first field F41 of 1 octet, which indicates the address of the access point of the interface between the network layer and the data link layer on transmission (one currently uses the term of SSAP Source Service Access Point). Here, the value of this address is zero, because no access to the network layer is necessary,
— a second field F42 of 1 octet, which indicates the address of the access point of the interface between the data link layer and the network layer on reception (one habitually uses the term of DSAP Destination Service Access Point). The value of this address is also zero,
— a third field F43 called check field encoded in 1 octet, which indicates the type of frame; here a TEST frame is concerned which, according to the OSI 802.2 standard, corresponds to the hexadecimal code E3,
— a fourth field F44 encoded in 27 octets, which contains the actual information, that is to say, in this case a message indicating that a monitoring frame is concerned.

Figure 3:
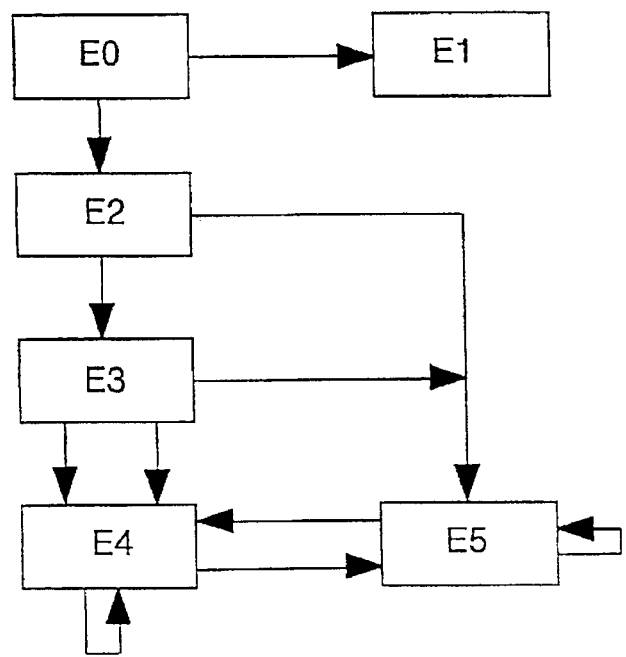
—FIG. 3 shows a state diagram of a piece of interconnection equipment according to the invention.

FIG. 3 shows a state diagram of a piece of interconnection equipment according to the invention. The state E0 of this diagram corresponds to the initial state. Starting from this state E0 two situations are possible when a piece of interconnection equipment is inserted in the circuit:

— in a first case, the piece of interconnection equipment is configured for functioning in the conventional mode (non-redundant) and it thus changes to the state E1 which corresponds to a conventional operation of the piece of interconnection equipment,
— in a second case, the piece of interconnection equipment is configured for functioning in the redundant mode and it proceeds to the state E2. In the state E2 the piece of interconnection equipment listens in on the local area network for a predetermined first period of time called monitoring period and denoted by Ts2, so as to detect a possible monitoring frame which would be transmitted by the other redundant piece of interconnection equipment to indicate that it is active. Such a situation occurs when a piece of interconnection equipment is restarted after a breakdown. If it receives in effect a monitoring frame during this monitoring period Ts2, the piece of interconnection equipment changes to the state E5, that is to say, to the stand-by mode. If not, when the duration of the monitoring period Ts2 has elapsed, it changes to the state E3.

The state E3 makes it possible to solve the conflicts in the case where the two redundant pieces of interconnection equipment start simultaneously. In this state, the piece of interconnection equipment starts by transmitting a monitoring frame. If, during a second monitoring period Ts3, it receives a monitoring frame from the other redundant piece of interconnection equipment, there is a conflicting situation. It is thus the piece of interconnection equipment that has the smaller specific physical address which becomes active and the other piece of interconnection equipment changes to the stand-by mode. Summarizing, when the piece of interconnection equipment is in the state E3, if it receives a monitoring frame and if its specific physical address is larger than that of the other redundant piece of interconnection equipment, it changes to state E5, that is to say, to the stand-by mode. On the other hand, if the duration of the monitoring period Ts3 has elapsed or the piece of interconnection equipment receives a monitoring frame and its specific physical address is smaller than that of the other redundant piece of interconnection equipment, the piece of interconnection equipment according to the invention changes to the state E4, that is to say, to the active mode.

When it is in the state E2 or in the state E3, the piece of interconnection equipment does not process the data frames it receives.

In the active mode E4 the piece of interconnection equipment conventionally processes the data frames it receives. Furthermore, at regular intervals Te it transmits a monitoring frame which has the other redundant piece of interconnection equipment as its destination. For that matter, if it receives a monitoring frame and its specific physical address is lower than that of the other redundant piece of interconnection equipment, the piece of interconnection equipment according to the invention remains in the active state. On the other hand, if it is higher, a change is made to the stand-by mode E5.

In the stand-by mode E5, the piece of interconnection equipment according to the invention does not process the data frames it receives. When it receives a monitoring frame, it reactivates a timer called monitoring timer. When the monitoring timer expires, the piece of interconnection equipment changes to the active state E4.

Figure 4:
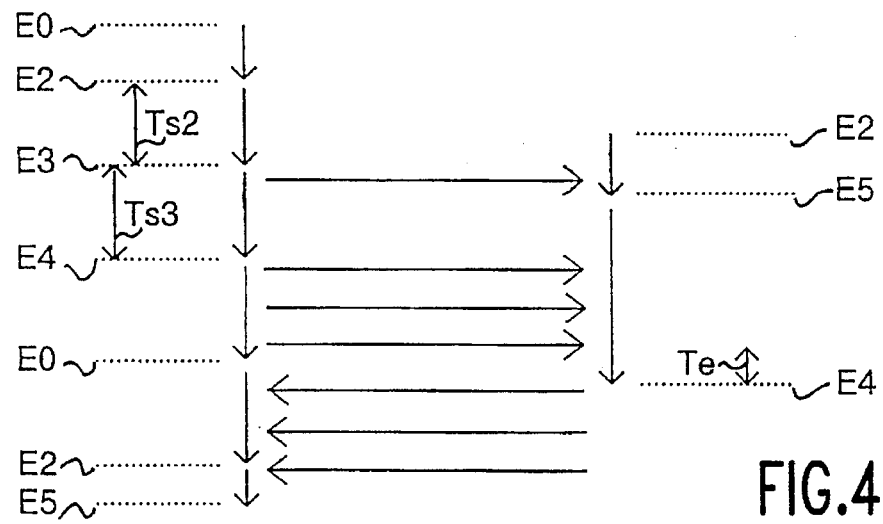
—FIG. 4 shows a diagram describing the exchanges between two redundant pieces of interconnection equipment at their consecutive starts, then during the substitution of the stand-by piece of interconnection equipment BR3 for the active piece of interconnection equipment BR2 following a breakdown of the latter.

FIG. 4 shows a diagram describing the exchanges between two redundant pieces of interconnection equipment during their consecutive starts, then during the substitution of the stand-by piece of interconnection equipment BR3 for the active piece of interconnection equipment BR2 following a breakdown of the latter.

The piece of interconnection equipment BR2 is first started and changes to the state E2 and listens in on the local area network for a first monitoring period Ts2. During this first monitoring period the piece of interconnection equipment BR3 is started. It then changes to the state E2 and listens in on the local area network. Once the monitoring period Ts2 of the piece of interconnection equipment BR2 has elapsed, it changes to the state E3 and transmits a monitoring frame to the piece of interconnection equipment BR3, then listens in on the local area network for a second monitoring period Ts3. The piece of interconnection equipment BR3 receives this monitoring frame and changes to the stand-by mode E5. Once the second monitoring period Ts3 of the piece of interconnection equipment BR2 has elapsed, it changes to the active state E4 and transmits at regular time intervals Te a monitoring frame to the piece of interconnection equipment BR3. Then, after a breakdown, the piece of interconnection equipment BR2 is put out of service. The monitoring timer of the piece of interconnection equipment BR3 thus expires (Te) without having received a monitoring frame from the piece of interconnection equipment BR2. It thus changes to the active state E4 and transmits monitoring frames to the piece of interconnection equipment BR2 at regular time intervals Te. Then, the piece of interconnection equipment BR2 is again put into service. It then changes to the state E2 and listens in on the local area network. It receives at the end of a certain period of time a monitoring frame from the piece of interconnection equipment BR3 and thus changes to the stand-by mode E5.

Figure 5:
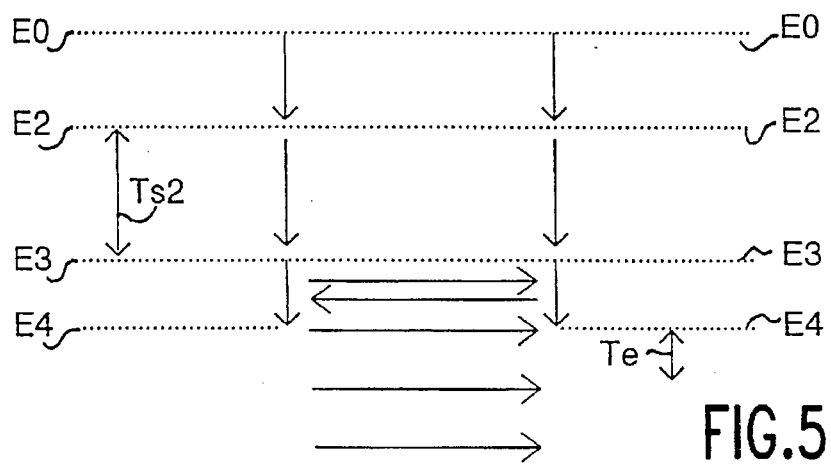
—FIG. 5 shows in a diagram exchanges between two redundant pieces of interconnection equipment in the case of a conflict between pieces of interconnection equipment at the start.

FIG. 5 shows a diagram of the exchanges between two redundant pieces of interconnection equipment in the case where there is a conflicting situation between pieces of interconnection equipment at the start.

The pieces of interconnection equipment BR2 and BR3 are simultaneously put into service. They change both to the state E2 and listen in on the local area network for the monitoring period Ts2. After the monitoring period has elapsed, they change to the state E3 and transmit a monitoring frame to the piece of interconnection equipment BR3, BR2, respectively. As the specific physical address of the piece of interconnection equipment BR2 is smaller than that of the piece of interconnection equipment BR3, the piece of interconnection equiment BR2 changes to the active mode E4, whereas the piece of interconnection equipment BR2, changes to the stand-by mode E5. Piece of interconnection equipment BR2, thus regularly transmits monitoring frames that have the piece of interconnection equipment BR3 as their destination.

Figure 6:
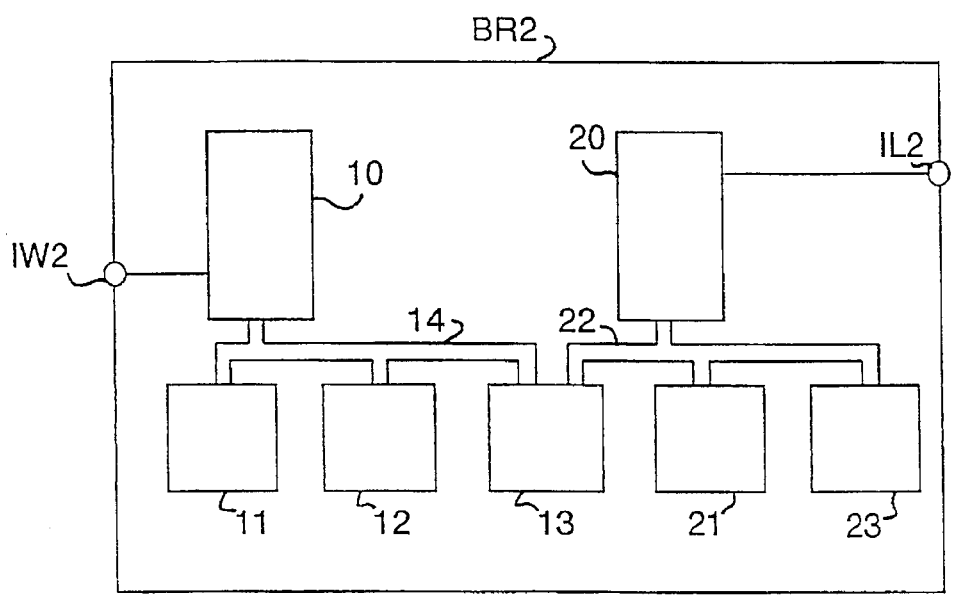
—FIG. 6 shows an embodiment for a piece of network interconnection equipment according to the invention.

According to FIG. 6, a piece of interconnection equipment BR2 according to the invention comprises a wide area network interface IW2 which is connected to an application processor 10 formed, for example, by a Motorola 6830. This processor 10 which itself is connected by a bus 14 to a memory 11 called equipment configuration memory, and which particularly contains a variable which indicates the conventional or redundant state of the interconnection equipment, as well as a false physical address, a specific physical address and a logical address of the interconnection equipment. The processor 10 is also connected by this bus 14 to a static memory 12, which contains the operating instructions of the processor 10, especially those necessary for implementing the invention in conformity with the state diagram shown in FIG. 3, and to a random access memory 13 containing data. The piece of interconnection equipment BR2 also comprises at least one local area network interface IL2 which is connected to a communication controller 20 formed, for example, for Ethernet local area networks, by an Intel 82503 transmitter and an Intel 82596DX controller. This communication controller 20 is itself connected by a bus 22 to a communication processor 23 formed, for example, by an Inmos T400 and to a static memory 21 which contains the operating instructions of the communication processor 23, particularly those necessary for implementing the invention, and to said data memory 13. The communication between the two processors 10 and 23 is thus effected via the data memory 13.

Needless to observe that modifications may be made in the embodiment which has just been described, more particularly by substitution of equivalent technical means, without leaving the scope of the present invention.

For example, it would be possible to realise the invention based upon a single piece of interconnection equipment which has the two distinct bridge/router functions which thus benefit from the same electrical and mechanical environment (in the form of two cards in the same chassis, for example).

It would also be possible to realise the invention based upon a piece of interconnection equipment which has a single processor which would combine the functions of the communication processor 23 and application processor 20.

We claim:

1. A local area network interconnection system comprising:

at least two local area networks interconnected via a wide area network; and interconnection nodes being formed by at least two redundant pieces of interconnection equipment, each piece of interconnection equipment having a specific physical address, wherein said redundant pieces of interconnection equipment have a false physical address and a logical address in common to form a unique entity with respect to stations of the local area network to which they are connected, the unique entity comprising at a given instant at least one piece of interconnection equipment called an active piece of interconnection equipment which ensures a function of bridge/router, and one other piece of interconnection equipment called a stand-by piece of interconnection equipment which is intended to ensure support to the active piece of interconnection equipment, wherein said redundant pieces of interconnection equipment further comprise monitoring means for monitoring their respective states by exchanges therebetween of frames called monitoring frames on the respective local area network, and wherein said monitoring frames are frames of the data link layer defined by the OSI 802.2 standard, and are carried in data fields of frames of the physical layer which are circulating on said respective local area network.

2. The local area network interconnection system as claimed in claim 1, wherein said monitoring means provides for the active piece of interconnection equipment to transmit regularly a monitoring frame which indicates its state on the respective local area network and has the stand-by piece of interconnection equipment as its destination, and provides for the stand-by piece of interconnection equipment to monitor a reception of said regularly transmitted monitoring frames and to pass to an active state when it no longer receives said regularly transmitted monitoring frames.

3. A piece of network interconnection equipment for use in an interconnection node formed by at least two redundant pieces of said network interconnection equipment connected to a local area network, said piece of interconnection equipment having a specific physical address, wherein said piece has a false physical address and a logical address in common with other redundant pieces to form a unique entity with respect to stations of the local area network to which they are connected, at a given instant one of said piece and said other redundant pieces having an active state and the others having a stand-by state, wherein said piece further comprises monitoring means for monitoring the respective states by exchanges therebetween of frames called monitoring frames on the local area network, and wherein said monitoring frames are frames of the data link layer defined by the OSI 802.2 standard, and are carried in data fields of frames of the physical layer which are circulating on said respective local area network.

4. The piece of network interconnection equipment as claimed in claim 3, wherein said monitoring means provides for the active piece of interconnection equipment to transmit regularly a monitoring frame which indicates its state on the respective local area network and has the stand-by piece of interconnection equipment as its destination, and further provides for the stand-by piece of interconnection equipment to monitor a reception of said regularly transmitted monitoring frames and to pass to an active state when it no longer receives said regularly transmitted monitoring frames.

5. The piece of network interconnection equipment as claimed in claim 3, further comprising means for inhibiting said piece of interconnection equipment, when in a stand-by mode, to establish a connection through a wide area network to a remote piece of interconnection equipment.

6. A local area network interconnection system comprising:

at least two local area networks interconnected via a wide area network; and interconnection nodes being formed by at least two redundant pieces of interconnection equipment, each piece of interconnection equipment having a specific physical address, wherein said redundant pieces of interconnection equipment have a false physical address and a logical address in common to form a unique entity with respect to stations of the local area network to which they are connected, the unique entity comprising at a given instant at least one piece of interconnection equipment called an active piece of interconnection equipment which ensures a function of bridge/router, and one other piece of interconnection equipment called a stand-by piece of interconnection equipment which is intended to ensure support to the active piece of interconnection equipment, wherein each of said two redundant pieces of interconnection equipment of a same node is seen along a connection by remote pieces of interconnection equipment of the wide area network, while one of these connections is structured as a primary connection and the other as a secondary connection, wherein said remote pieces of interconnection equipment comprise means for trying to establish with priority, in an attempt at connecting to a redundant node, the primary connection and after that, only in the case of a breakdown with respect to the primary connection, the secondary connection, and wherein said redundant pieces of interconnection equipment further comprise monitoring means for monitoring their respective states by exchanges therebetween of frames called monitoring frames on the respective local area network.

7. A local area network interconnection system comprising:

at least two local area networks interconnected via a wide area network; and interconnection nodes being formed by at least two redundant pieces of interconnection equipment, each piece of interconnection equipment having a specific physical address, wherein said redundant pieces of interconnection equipment have a false physical address and a logical address in common to form a unique entity with respect to stations of the local area network to which they are connected, the unique entity comprising at a given instant at least one piece of interconnection equipment called an active piece of interconnection equipment which ensures a function of bridge/router, and one other piece of interconnection equipment called a stand-by piece of interconnection equipment which is intended to ensure support to the active piece of interconnection equipment, wherein the local area network interconnection system further comprises means for determining the piece of interconnection equipment that is active when operating in a normal mode based upon the specific physical addresses of said redundant pieces of interconnection equipment.

8. A system as claimed in claim 7, characterized in that said means for determining determines the piece of interconnection equipment that is active when operating in the normal mode to be the piece of interconnection equipment having the lesser physical address.

9. A system as claimed in claim 7, characterized in that said redundant pieces of interconnection equipment further comprise monitoring means for monitoring their respective states by exchanges therebetween of frames called monitoring frames on the respective local area network.

10. A local area network interconnection system comprising:

at least two local area networks interconnected via a connection-oriented wide area network, at least one interconnection node of said wide area network having a local area network connected thereto and being formed by at least two redundant pieces of interconnection equipment, said redundant pieces of interconnection equipment having a false physical address and a logical address in common to form a unique entity with respect to stations of said local area network to which they are connected, wherein each of said two redundant pieces of interconnection equipment of a same node is seen along a connection by remote pieces of interconnection equipment of the wide area network, while one of these connections is structured as a primary connection and the other as a secondary connection, wherein said remote pieces of interconnection equipment comprise means for trying to establish with priority, in an attempt at connecting to a redundant node, the primary connection and after that, only in the case of a breakdown with respect to the primary connection, the secondary connection.

11. A system as claimed in claim 10, characterized in that said primary connection is the connection to the redundant piece of interconnection equipment having the least physical address.

12. A system as claimed in claim 10, characterized in that said interconnection node of said wide area network having a local area network connected thereto is formed by two redundant pieces of interconnection equipment.

13. A system as claimed in claim 12, characterized in that said primary connection is the connection to the redundant piece of interconnection equipment having the lesser physical address.

14. A local area network interconnection system comprising:

- at least two local area networks interconnected via a connection-oriented wide area network, at least one interconnection node of said wide area network having a local area network connected thereto and being formed by at least two redundant pieces of interconnection equipment,
- each said redundant piece of interconnection equipment having, in addition to a respective specific physical address, a false physical address and a logical address in common with the other redundant piece of interconnection equipment to form a unique entity with respect to stations of said local area network to which the at least two redundant pieces of interconnection equipment are connected,
- wherein each of said two redundant pieces of interconnection equipment of a same node is seen along a respective connection by a remote piece of interconnection equipment of the wide area network, and
- wherein said remote piece of interconnection equipment comprises means for trying to establish, in an attempt at connecting to a redundant node, one of said connections in a priority order based upon the respective specific physical address of said redundant pieces of interconnection equipment.

* * * * *